Feb. 22, 1944.  C. B. GATY ET AL  2,342,509
CAMERA
Filed May 24, 1941  10 Sheets-Sheet 1

INVENTOR
George Rattray
BY Clinton B. Gaty
Blair, Curtis & Hayward
ATTORNEYS

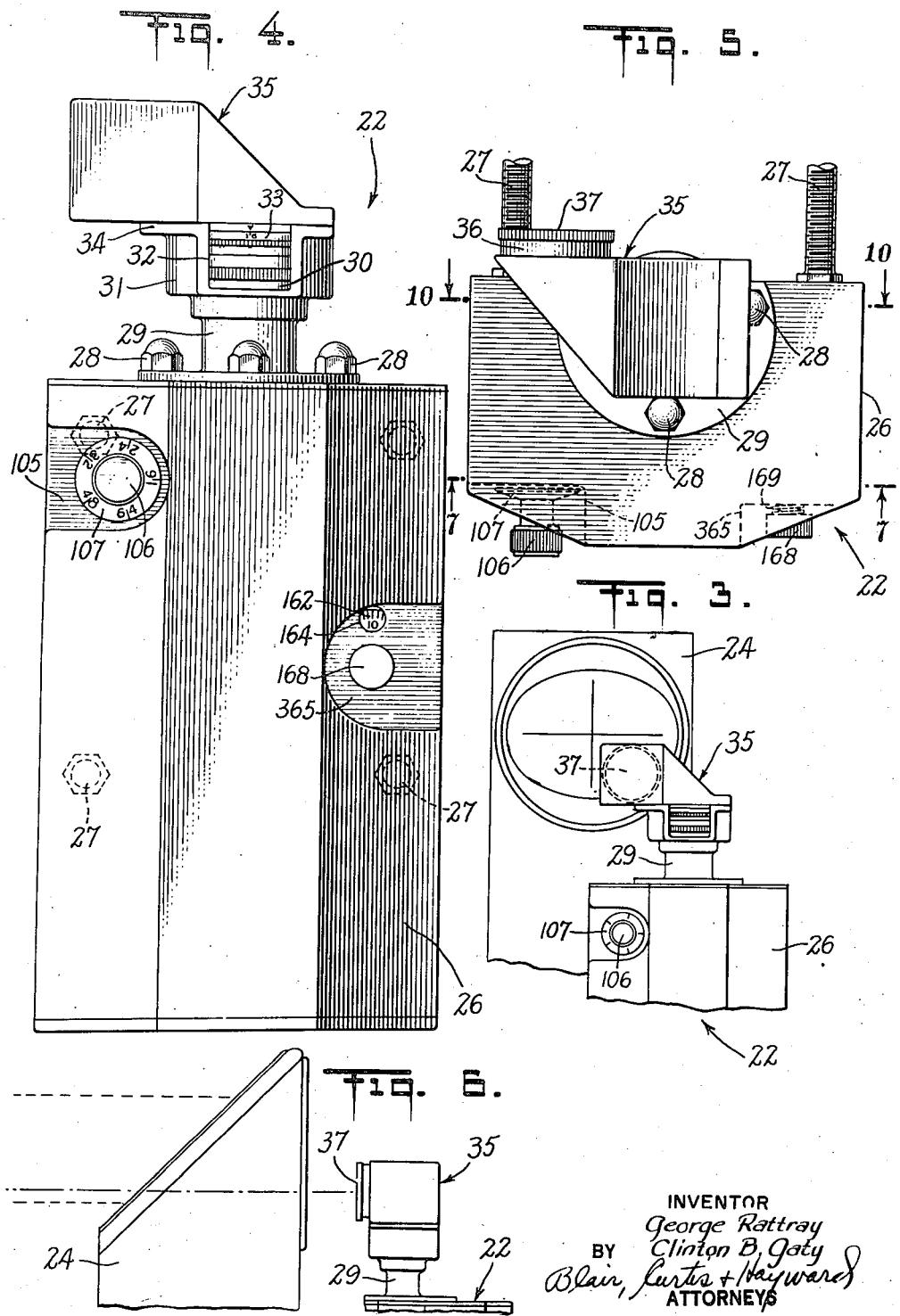

Feb. 22, 1944. C. B. GATY ET AL 2,342,509
CAMERA
Filed May 24, 1941 10 Sheets-Sheet 3
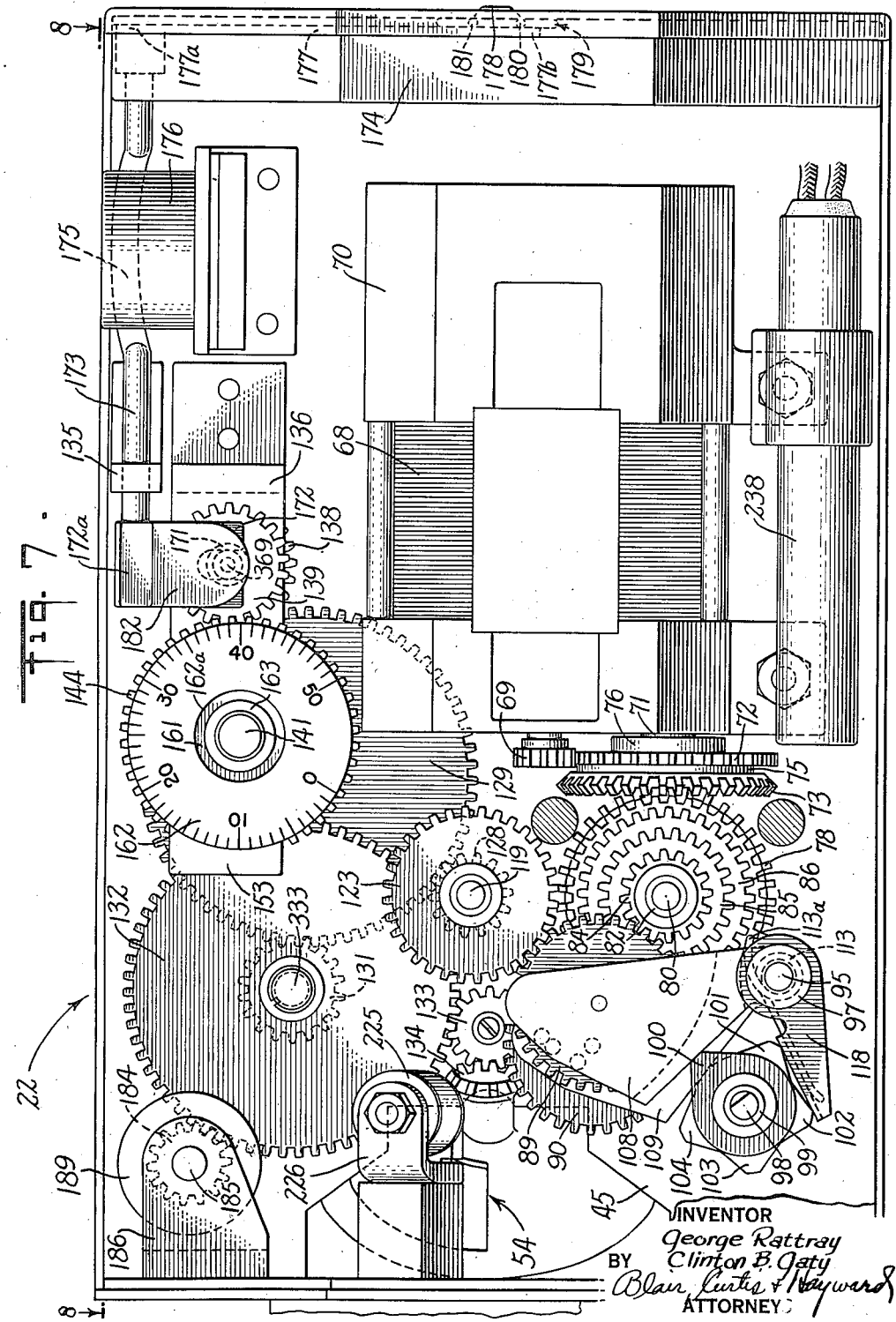
INVENTOR
George Rattray
Clinton B. Gaty
BY
Blair, Curtis & Hayward
ATTORNEYS

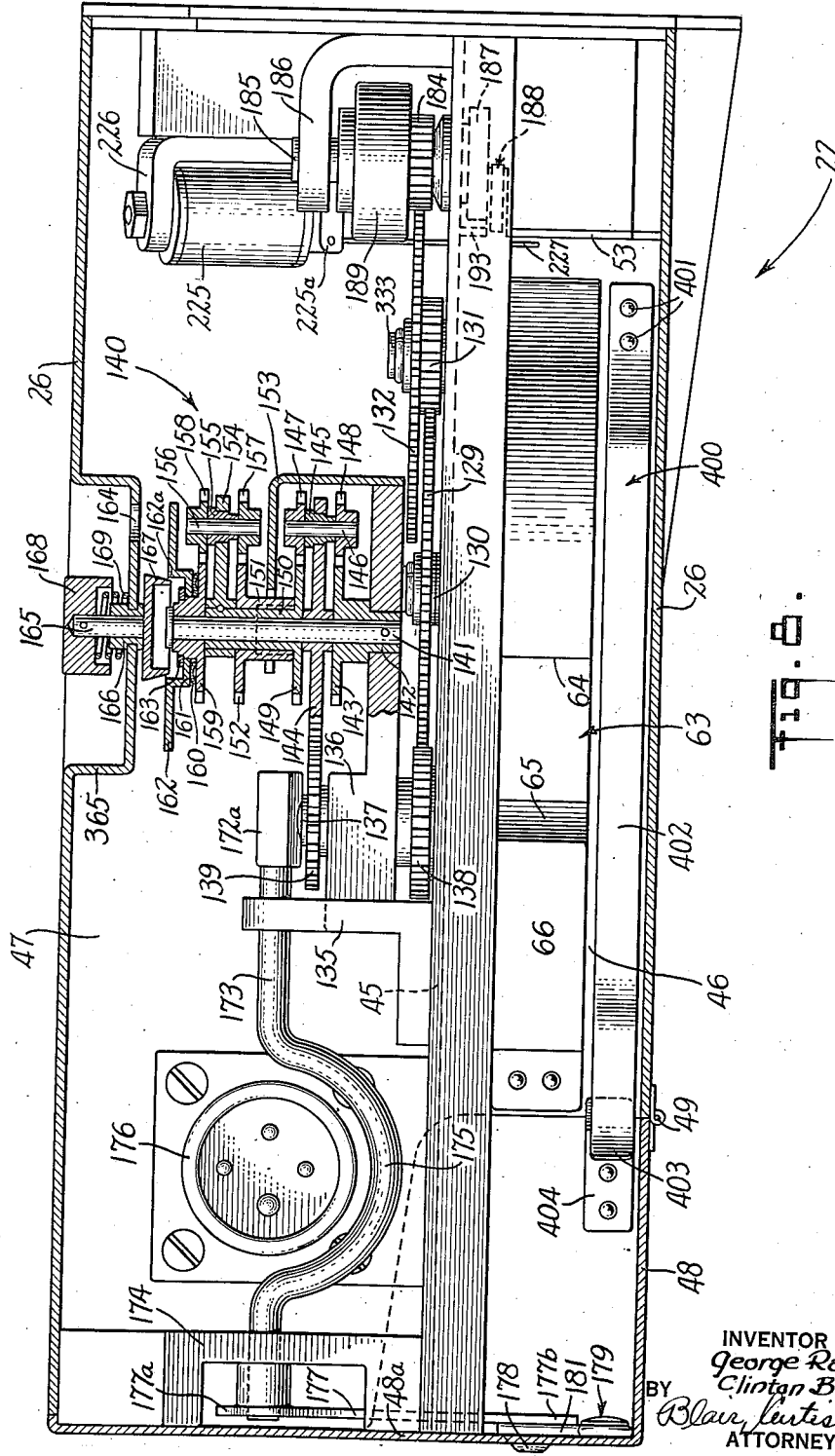

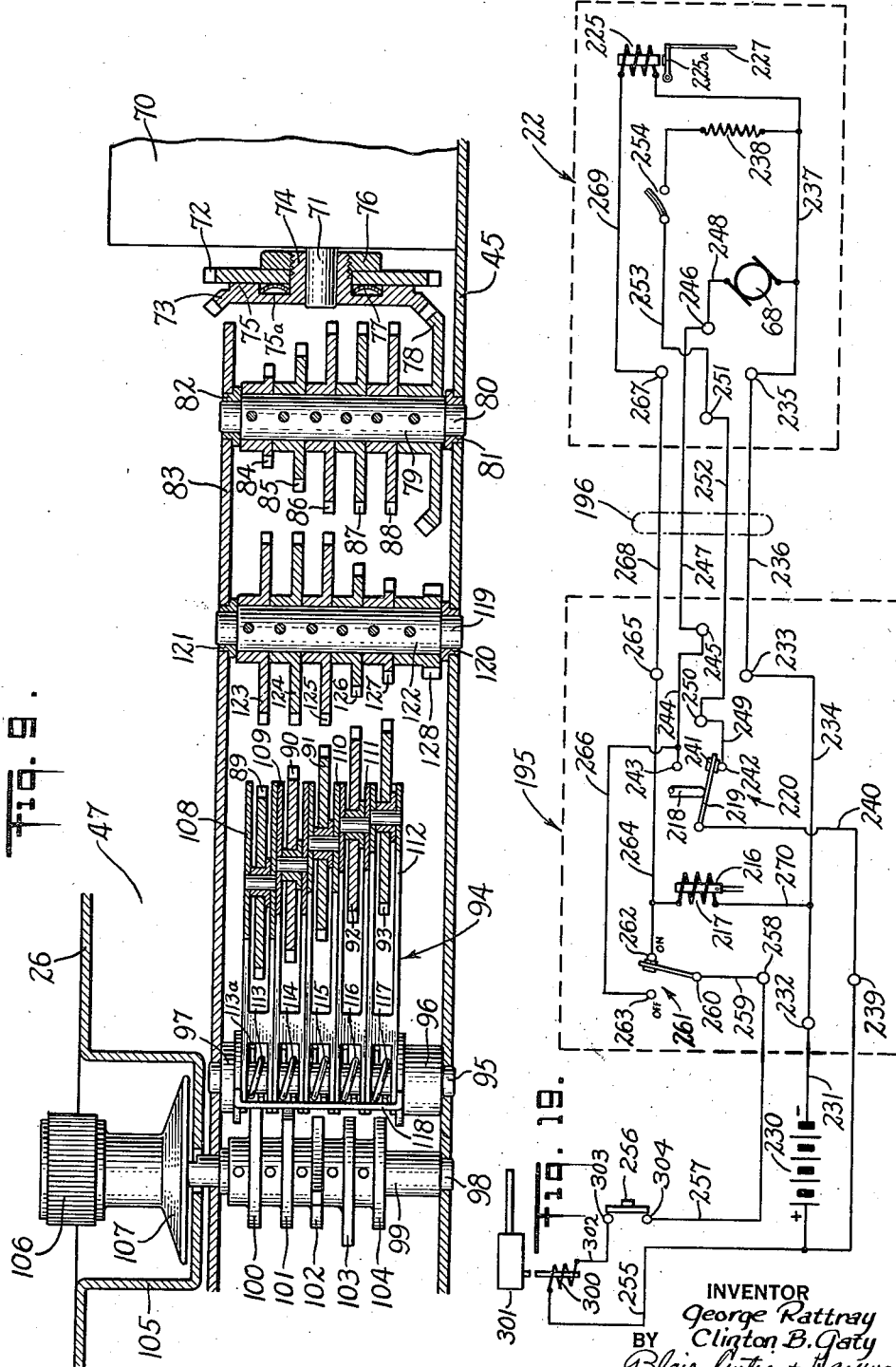

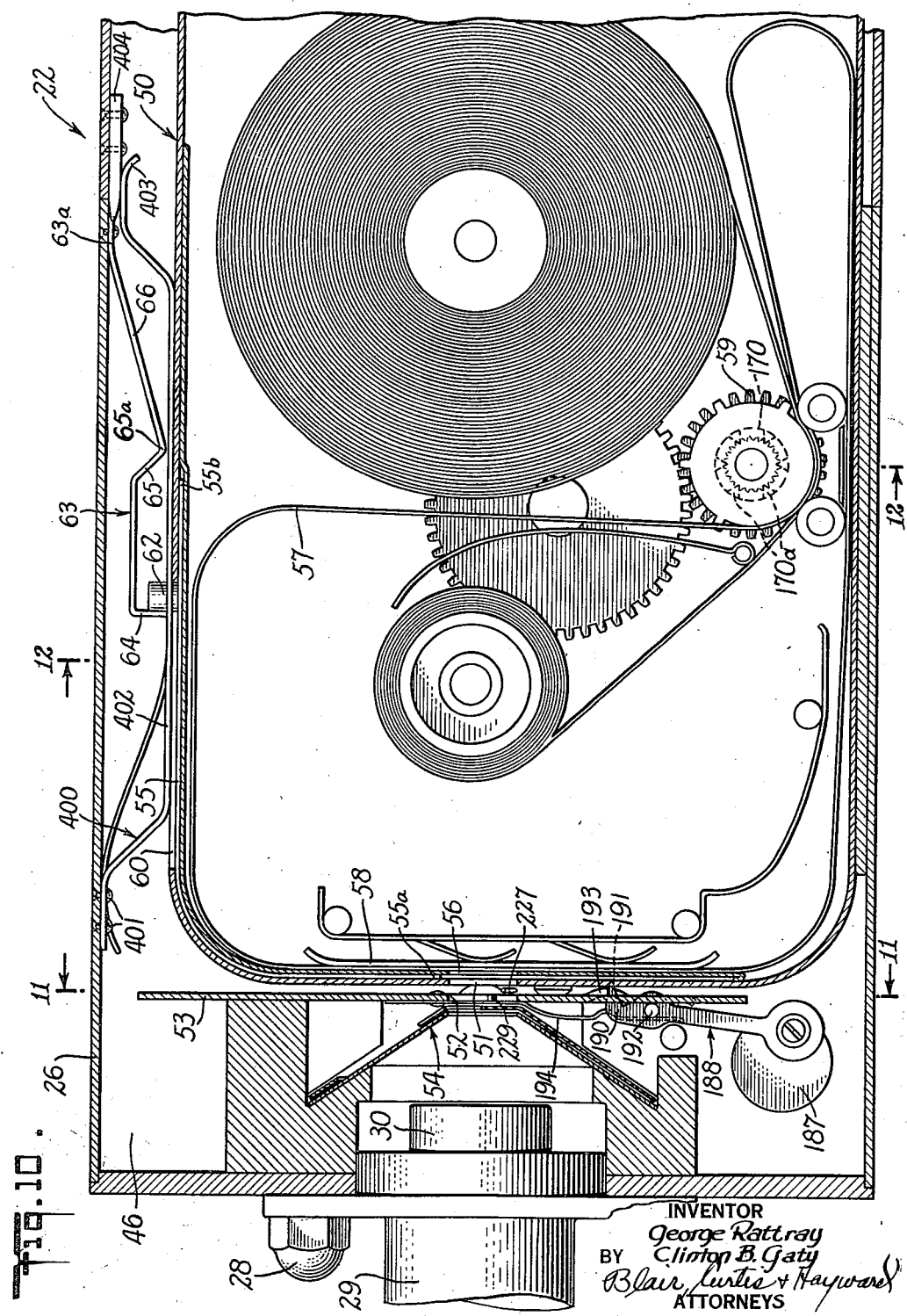

Feb. 22, 1944.  C. B. GATY ET AL  2,342,509
CAMERA
Filed May 24, 1941  10 Sheets-Sheet 7
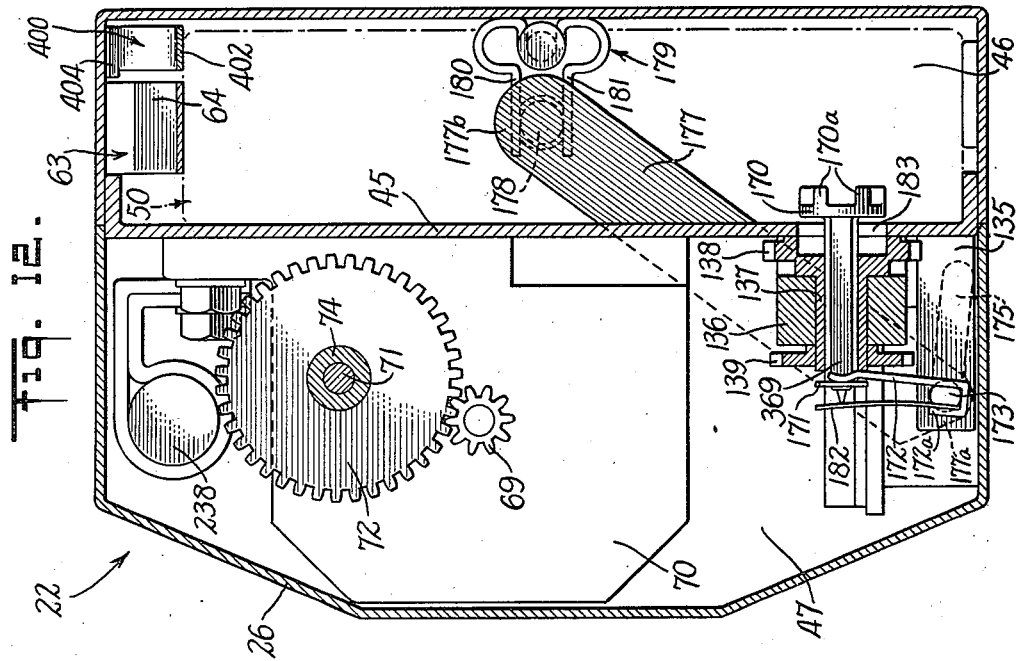
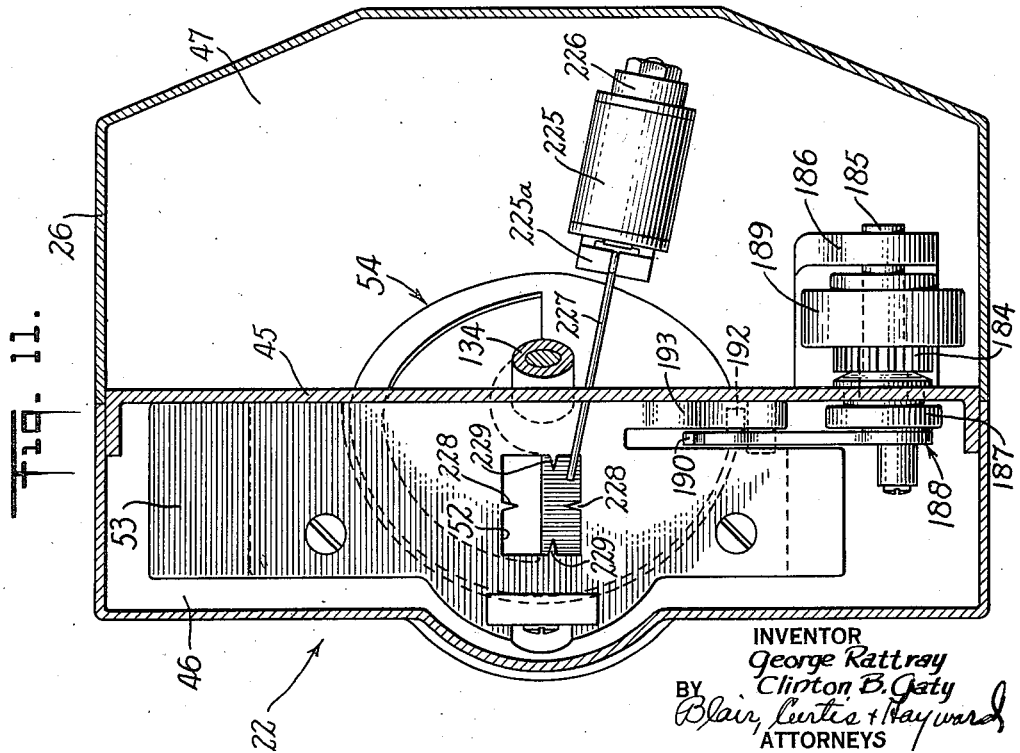
INVENTOR
George Rattray
Clinton B. Gaty
BY
Blair, Curtis & Hayward
ATTORNEYS Feb. 22, 1944.   C. B. GATY ET AL   2,342,509
CAMERA
Filed May 24, 1941   10 Sheets-Sheet 8
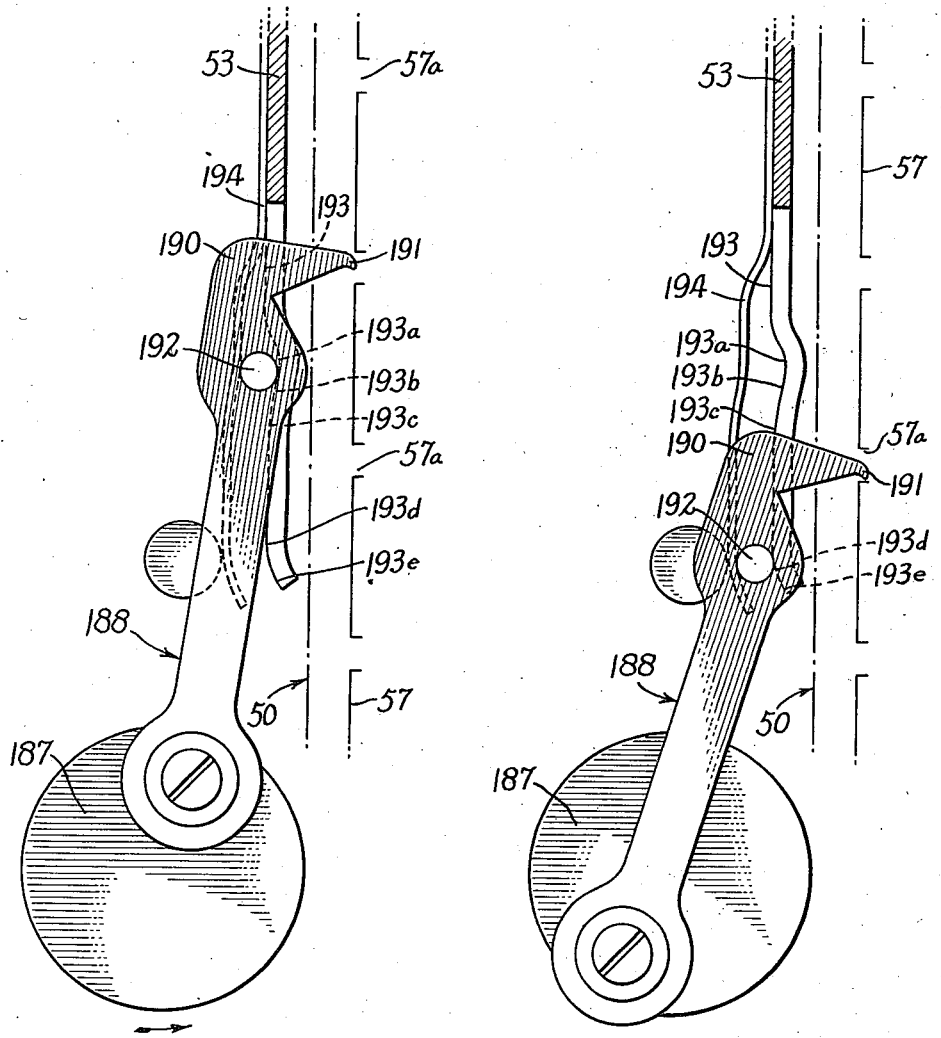
INVENTOR
George Rattray
BY Clinton B. Gaty
Blair, Curtis + Hayward
ATTORNEYS Feb. 22, 1944.  C. B. GATY ET AL  2,342,509
CAMERA
Filed May 24, 1941  10 Sheets-Sheet 9

INVENTOR
George Rattray
BY Clinton B. Gaty
Blair, Curtis & Hayward
ATTORNEYS

Feb. 22, 1944.   C. B. GATY ET AL   2,342,509
CAMERA
Filed May 24, 1941   10 Sheets-Sheet 10

INVENTOR
George Rattray
BY Clinton B. Gaty
Blair, Curtis + Hayward
ATTORNEYS

Patented Feb. 22, 1944

2,342,509

UNITED STATES PATENT OFFICE 2,342,509

CAMERA

Clinton B. Gaty, Jamaica, and George Rattray, Mineola, N. Y., assignors to Fairchild Aviation Corporation, Jamaica, N. Y., a corporation of Delaware Application May 24, 1941, Serial No. 395,098

6 Claims. (Cl. 88—16)

This invention relates generally to moving picture cameras, and more particularly to a moving picture camera adapted for use in conjunction with a machine gun, or in conjunction with a gun sight adapted to be located on an airplane.

Heretofore machine gun cameras have been used primarily for training purposes, and have been inherently incapable of recording results of actual combat. While such cameras are satisfactory to a certain extent for training purposes, they have real limitations which restrict their efficiency in use for such purposes, by reason of creating conditions complicating the scoring of the photographic results to the extent that laborious and difficult interpolation is necessary to render the score anywhere near correct. Furthermore, certain structural aspects of these cameras preclude their use with usual airplane armament and indeed necessitate the replacement of such armament with a dummy gun incorporating the camera.

The speed of light being substantially in excess of bullet velocity precludes the recording of the results of actual or simulated fire subsequent to cessation of operation of such cameras. Furthermore, assuming that these cameras could be used with actual combat armament, the same inherent incapacity pertains as the camera cannot photograph the results of bullets discharged a few seconds before the gun stops firing. Still further, such cameras are not capable of use with machine gun sights as are at present installed in the cockpits of combat airplanes.

It is accordingly among the objects of this invention to provide a machine gun camera which is not only ruggedly constructed, durable over an extended period of use, and capable of withstanding substantial variations in temperature and altitude, but is also able to simulate actual combat conditions, as well as faithfully record actual combat results in their entirety. It is another object of this invention to provide with a machine gun camera apparatus capable of maintaining the camera in operation subsequent to the cessation of firing of the machine gun in a dependable manner and for an accurately predeterminable period of time regardless of the temperature at which the camera is operating. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the drawings, in which is shown one of the various possible embodiments of the invention, Figure 1 is a fragmentary top plan view of an airplane having installed thereon a machine gun equipped with the camera;

Figure 3 is an enlarged fragmentary elevation of the camera connected to the cockpit gun sight;

Figure 4 is an elevation of the camera;

Figure 5 is a top plan view of the camera;

Figure 6 is a fragmentary side elevation of the combined gun sight and camera shown in Figure 3;

Figure 7 is an enlarged section taken along the line 7—7 of Figure 5;

Figure 8 is a section taken along the line 8—8 of Figure 7, a portion thereof being broken away, and a portion being shown in section;

Figure 9 is a fragmentary developed view, partially in section, of the change gear system for varying the feed rate of the film;

Figure 10 is a fragmentary section taken along the line 10—10 of Figure 5;

Figure 11 is a section taken along the line 11—11 of Figure 10;

Figure 12 is a staggered section taken along the line 12—12 of Figure 10;

Figure 13 is an enlarged view of a portion of the film driving mechanism shown in Figure 10;

Figure 14 is a view similar to Figure 13 showing the mechanism in a different position;

Figure 17 is a staggered section taken along the line 17—17 of Figure 15;

Figure 18 is a schematic view of the overrun device shown in Figures 16 and 17; and, Figure 19 is a wiring diagram of the control circuit for the machine gun camera and overrun.

Similar reference characters refer to similar parts throughout the various views of the drawings.

Figure 1:
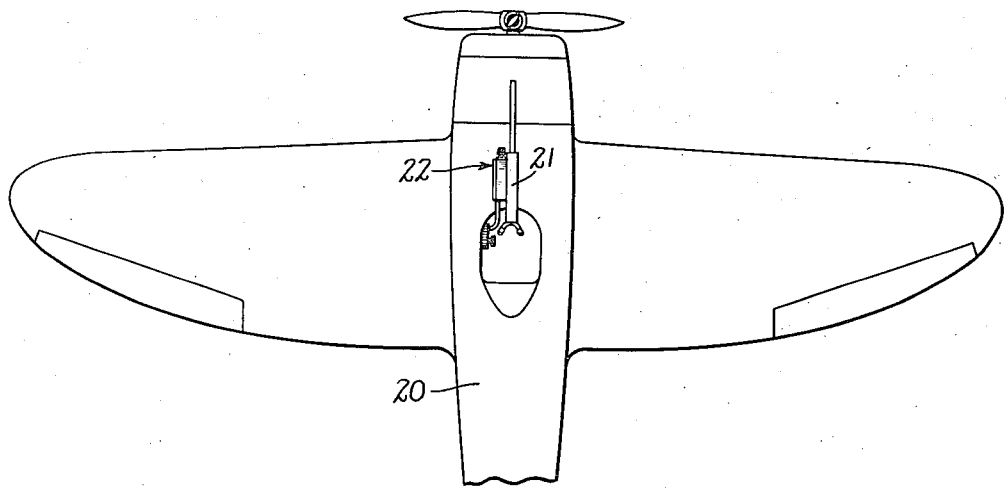
Figure 2:
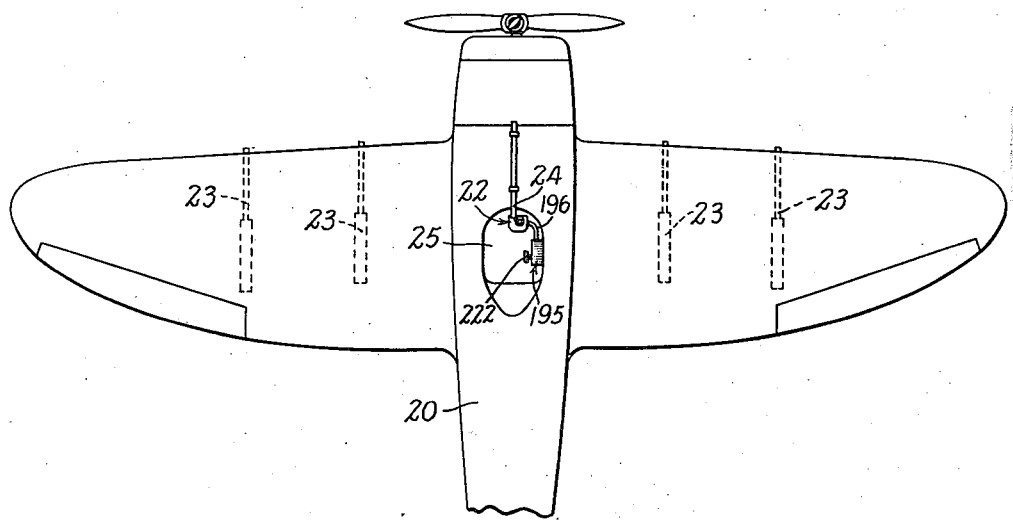
Figure 2 is a view similar to Figure 1, but showing the camera installed in conjunction with a cockpit gun sight.

Referring first to Figure 1, an airplane 20 has attached thereto a machine gun 21, to the side of which the camera, generally indicated at 22 is bolted, the camera being boresighted with the gun. The camera thus installed is, in effect, an integral part of the gun. As shown in Figure 2, airplane 20 includes a plurality of wing guns 23 which, as in the case of gun 21 (Figure 1) are aimed by aiming the airplane at the target. In this instance, however, camera 22 (Figure 2) is not directly connected to any of the guns, but rather is installed in conjunction with a gun sight 24 mounted in the airplane cockpit 25, as will be described in more detail hereinbelow.

As is shown in Figures 4 and 5, camera 22 includes a casing 26 which houses the film magazine, shutter operating mechanism, film feeding system and drive therefor, all as will be described hereinbelow. Secured to and extending from casing 26 are a plurality, conveniently four, of securing studs 27, by which the camera may be secured either to gun 21 (Figure 1) or to gun sight 24 (Figure 2). The top of camera housing 26 (Figure 4) has bolted thereto by bolts 28, a flanged hub 29, within which a camera lens 30 of suitable characteristics is mounted. Hub 29 has an enlarged housing portion 31, open as at 32 to provide access to a diaphragm control ring 33.

Housing 31 includes a flange 34 (Figure 4) to which is secured an erecting system generally indicated at 35 which, as is better shown in Figure 5, comprises a conduit for the transmission of light through the camera lens from a direction normal thereto. Erecting system 35 is also provided with a suitable mount 36 to support a filter 37. Through the provision of erecting system 35, camera 22 (Figure 3) may be installed horizontally in the airplane cockpit, so as to take up as little room as possible, and furthermore may be connected to gun sight 24 in such a manner that the erecting system covers up but a small portion of the eyepiece of the gun sight, but still is capable, the camera lens being of infinite focus, of photographing not only the target, but also the reticle in the gun sight. The gun sight is, of course, boresighted with the machine guns on the airplane, and accordingly the camera is able to photograph the position of the target at which the guns are firing or at which fire is being simulated, and thus record the relationship of the target with respect to the reticle of the gun sight, rendering scoring merely a matter of looking at the photographic record.

It might be well to point out at this time that when camera 22 is mounted directly on the gun, as shown in Figure 1, erecting system 35 is not used, it being used only when the camera is used in conjunction with gun sight 24, as shown in Figure 3. Furthermore, when the camera is mounted on the gun sight, it is used only as a fixed camera, i. e., the camera is immovable relative to the airplane, and under such circumstances it is preferred that a three inch lens be used in conjunction with the erecting system. It is possible, of course, to use the camera in conjunction with a flexible gun, under which circumstances the camera may be either directly mounted on the gun, as shown in Figure 1, or on a gun turret (not shown). When the camera is used with a flexible gun, we prefer to use a one inch lens, or a lens of approximately that focal length, but without erecting system 35. Inasmuch as the camera lens is focused at infinity, as noted above, there are no provisions made for focusing.

Referring now to Figure 12, camera casing 26 has extending longitudinally therethrough a partition 45 which divides the casing into a film magazine compartment 46 and an operating mechanism compartment 47. As shown in Figure 8, these compartments are permanently closed at the right hand end, and are provided at the other end with a closure or door 48 hinged as at 49 to the bottom of casing 26. Compartment 46 is dimensioned to receive a commercial film magazine, generally indicated at 50 (Figure 10). Film magazine 50 has an opening 51 which when the magazine is properly positioned within its compartment 46 registers with an opening 52 in a partition 53 adjacent the camera shutter generally indicated at 54, and further which is in alignment with the optical axis of the camera lens system. Opening 51 in magazine 50 is closed by an elongated flexible safety gate or slide 55 (i. e. closed when the magazine is out of the camera) which extends from a point 55a adjacent the lower edge of partition 53 to a point 55b along the upper side of the magazine 50, as viewed in Figure 10; slide 55, of course, is located within the magazine. Slide 55 also has an opening 56 formed therein which, when magazine 50 is in its compartment 46 registers with magazine opening 51 and partition opening 52, these three openings accordingly being aligned with shutter mechanism 54 and the camera's optical axis. Hence, as the film 57 in magazine 50 is fed from the supply spool to the rewind spool, it passes between slide 55 and a presser plate 58 so that the film frames pass across opening 56 to receive light directed therethrough. The film is fed from the supply spool in the magazine past opening 56 and wound on the rewind spool, through the operation of a sprocket 59 in magazine 50, which sprocket is driven by mechanism which will be hereinafter described.

Still referring to Figure 10, magazine 50 has a slot 60 cut in one side thereof, and through this slot extends a pin 62, the inner end of which is connected to slide 55. As shown, pin 62 abuts or lies near the rear edge of slots 60, in which position slide opening 56 is in registry with magazine opening 51. When pin 62 abuts the forward edge of slot 60, openings 56 and 51 are out of registry so that magazine opening 51 is closed.

A leaf spring, generally indicated at 63, has one end 63a thereof secured in any suitable manner to the side of camera casing 26. Midway of the ends of spring 63 are a pair of abutments 64 and 65, the former of which is parallel with pin 62 and the latter of which is inclined with respect thereto. Between spring end 63a and spring abutment 65 is an inclined portion 66 against which pin 62 rides when magazine 50 is inserted in compartment 46. As the pin passes along spring portion 66, the spring is depressed so that pin 62 may ride over point 65a of spring abutment 65. After the pin has passed this point, the spring is free to snap back into the position shown in Figure 10, wherein the pin and spring abutment 64 engage as the magazine is inserted. As soon as these two parts engage, and upon continued insertion of the magazine, pin 62 is slid along slot 60 until it engages the rear extremity of the slot, at which point magazine 50 is in proper operating position with slide opening 56 and magazine opening 51 in registry.

When magazine 50 is withdrawn from its compartment 46, i. e., when it is moved to the right, as viewed in Figure 10, pin 62 engages spring abutment 65 until the pin abuts or nears the left-hand extremity of slot 60. With the pin in this position, slide 55 has closed magazine opening 51. Continued withdrawal of the magazine causes pin 62 to ride over spring point 65a so that the magazine may be completely withdrawn from compartment 46.

As shown in Figures 8 and 10, an elongated relatively stiff spring 400 is riveted or otherwise secured to the camera casing as at 401 (Figure 10) and includes a portion 402 adapted to bear against the side of magazine 50. By reason of the stiffness of spring 400, it holds the magazine securely in its proper operative position against such displacing tendencies to which the camera might be subjected. The free end of spring 400 is provided with a lip 403 under which a cam 404 riveted to camera door 48 (Figure 8) is adapted to enter when the camera door is closed. As may be seen in Figure 10, this action of the cam increases the stiffness of spring 400 forcing spring portion 402 firmly against the side of magazine 50.

Referring now to Figure 7, partition 45 of casing 26 supports within drive mechanism compartment 47 (Figure 12) a motor 68 (Figure 7) on the armature shaft of which is mounted a small spur gear 69. Motor 68 is mounted in a relatively heavy housing 70 (Figure 9) from which a stud 71 extends. A bevel gear 73, having a hub 74, is freely mounted on stud 71, this bevel gear also including an annular shoulder or projection 75 forming an annular slot 75a in which is disposed a spring 77 adapted to engage a large spur gear 72 rotatably mounted on hub 74 and meshing with small gear 69 (Figure 7). A collar 76 is threaded on the inner end of hub 74 to adjust the bias of spring 77 against gear 72. It may now be seen that upon operation of motor 68 (Figure 7) spur gear 69 drives gear 72 (Figure 9) which in turn drives bevel gear 73 through the engagement between gear 72 and clutch surface 75. Hence, if any of the mechanism driven by bevel gear 73 jams, or if the film jams, gear 72 may rotate relative to bevel gear 73, and neither the drive mechanism nor the motor will be damaged.

Bevel gear 73 meshes with, and accordingly drives a bevel gear 78 (Figure 9) which is pinned to a sleeve 79 secured to a shaft 80 journaled in bushings 81 and 82 secured respectively to partition 45 and a plate 83 supported in drive mechanism compartment 47. Also pinned to sleeve 79, to rotate therewith, are five change gears 84, 85, 86, 87 and 88, which are respectively engageable with idler gears 89, 90, 91, 92 and 93, rotatably mounted in a carrier generally indicated at 94. Change gears 84—88 and their respective idlers are designed to provide the different film feed rates between 16 and 64 film frames per second, and as will be hereinafter described, any one of these gears may be selected for the feed rate desired. Idler gear carrier 94 is pivotable about a shaft 95 mounted in and between partition 45 and plate 83, the carrier being located between spacer washers 96 and 97 also carried by shaft 95. Still another shaft 98 is mounted in and between partition 45 and plate 83. A sleeve 99 is secured to shaft 98, and on this sleeve are pinned five cams 100, 101, 102, 103 and 104.

Still referring to Figure 9, camera casing 26 includes a depressed chamber 105, through the bottom of and into which the upper end of shaft 98 extends. A knurled knob 106 is disposed within chamber 105 and secured to the upper end of shaft 98. This knob is connected to a dial 107 which, as is shown in Figure 4, is suitably marked to indicate the different film feed rates selectable by manipulation of the knob.

As shown in Figure 9, idler gear carrier 94 includes a plurality of individual carriers 108, 109, 110, 111 and 112, in which idler gears 89—93 respectively are rotatably mounted. A plurality of springs 113, 114, 115, 116 and 117 are wound about shaft 95, and each has one end bearing against one carrier. For example, end 113a (Figure 7) of spring 113 biases carrier 108 toward the cam 100. The other carriers are similarly biased by their springs toward their carriers. The other ends of these springs all press against a plate 118 and force the plate against at least two of the cams, e. g., cams 101 and 102, which are not in use.

Referring back to Figure 9, a shaft 119 has its opposite ends journaled in bushings 120 and 121 which are respectively secured to partition 45 and plate 83, and to this shaft is secured a sleeve 122. A plurality of gears 123, 124, 125, 126 and 127 are pinned to sleeve 122, and are adapted to be selectively engaged by idlers 89—93, according to which one thereof is pivoted by operation of one of cams 100—104 into meshing engagement with one of drive gears 84—88. For example, if knob 106 is so manipulated as to engage cam 100 (see Figure 7) with idler carrier 108, idler 89 is meshed not only with drive gear 84, but also with gear 123, so that a drive train is established. Thus, assuming operation of motor 68, the following gear train is established: motor driven gear 69, spur gear 72, bevel gear 73, bevel gear 78, gear 84, idler 89, gear 123, and accordingly shaft 119.

With reference to Figure 9, it will be seen that small spur gear 128 is pinned to sleeve 122 so as to rotate therewith when one of gears 123—127 is driven as described above. As shown in Figure 7, gear 128 meshes with a large spur gear 129, rotatably mounted on a stud 130 (Figure 8) secured to and extending from partition 45; gear 129 in turn meshes with a small spur gear 131 preferably integral with a large gear 132, both of these gears being rotatably mounted on a stud 333, secured to and extending from partition 45. Large gear 132 (Figure 7) meshes with a gear 133 rotatably mounted within the camera drive mechanism compartment 47, and gear 133 in turn meshes with a gear 134 which is connected to and accordingly drives camera shutter 54. Large gear 132 also drives a portion of the film feed mechanism as will be described hereinbelow.

Referring back to Figure 8, partition 45 has secured thereto an angle 135, to the upwardly extending arm of which is secured a mounting plate 136 which provides suitable support for the film footage indicator and drive mechanism therefor, as will be described. As is more clearly shown in Figure 12, plate 136 rotatably supports the elongated hub 137 of a gear 138 which gear (see Figure 8) meshes with large gear 129. On the upper end of hub 137 (as viewed in Figure 8) is secured a spur gear 139 which drives the film footage indicating mechanism generally indicated at 140.

The film footage indicating mechanism 140 includes a shaft 141 which extends through the hub 142 of a stationary gear 143, the shaft and gear hub being pinned to plate 136. Freely rotatable on shaft 141 is a gear 144 which meshes with and is accordingly driven by gear 139. A bushing 145 extends through and is carried by gear 144, adjacent the periphery thereof and journals a stud 146 to the opposite ends of which are secured planetary gears 147 and 148. Planetary gear 148 meshes with stationary gear 143 and accordingly in following its orbit about the stationary gear imparts rotation to planetary gear 147 through stud 146.

Gear 147 in turn meshes with a gear 149 having an elongated hub 150 freely rotatable about shaft 141; gear hub 150 also supports the hub 151 of a gear 152 which is carried and held stationary by an angle 153 secured to mounting 136. An arm 154 includes a hub disposed about and staked to the upper end of gear hub 150 and accordingly this arm rotates with the hub and its gear 149 when the latter gear is driven by planetary gear 147.

The outer end of arm 154 carries a bushing 155 in which a stud 156 is journaled. The opposite ends of stud 156 have connected thereto planetary gears 157 and 158, the former of which meshes with stationary gear 152 and the latter of which meshes with a gear 159 freely rotatable on shaft 141.

It will now appear that a reduction between driving gear 139 and driven gear 159 is obtained through the planetary gear system described. Driven gear 159 has secured thereon a spring 160 which bears against a clutch surface 161 of an indicator plate 162 mounted on the hub of gear 159 and movable relative thereto. A collar 163 is threaded on the hub of gear 159 to force clutch surface 161 against spring 160 to adjust the clutch tension. It will now appear that while indicator plate 162 normally rotates with gear 159 it may be moved relative thereto and this for the purpose of setting the indicator plate in accordance with the amount of unexposed film in the camera. Indicator plate 162 (Figure 7) may be marked with indicia which are visible through an opening 164 (Figure 8) formed in the bottom of a chamber 365 in camera casing 26.

For the purpose of setting the indicator plate there is provided a manually operable stud 165 which extends through a bushing 166 carried by the bottom of chamber 365. The lower end of stud 165 carries an adjusting disc 167 which is frusto-conical in shape and accordingly has a tapered periphery. The periphery of disc 167 is adapted to engage an annular shoulder 162a on indicator plate 162 so that upon rotation of the disc the indicator may be moved relative to its driving gear 159.

The upper end of stud 165 has an adjustor knob 168 pinned thereto. A spring 169 coiled about stud 165 and disposed between knob 168 and the bottom of chamber 365 biases the knob and accordingly adjustor disc 167 away from indicator plate 162. Hence normally the adjustor disc and indicator plate are out of engagement. The footage indicator mechanism is, of course, synchronized to the film feed driving mechanism so that the amount of unexposed film can always be determined.

As noted above with reference to Figure 8, large gear 129 meshes with and accordingly drives gear 138. As is more clearly shown in Figure 12, the inside of hub 137 of gear 138 is splined and slidably receives a splined shaft 369. At one end of splined shaft 369 is a toothed disc 170, the teeth 170a of which are insertable or engageable in pockets formed in sprocket 59 (Figure 10). Thus it will appear that when gear 138 (Figure 8) is driven by gear 129 and sprocket 59 (Figure 10) is engaged by disc 170, the film 57 is drawn from the supply spool and rewound on the rewind spool in known manner.

To permit insertion of film magazine 50 within its compartment 46, disc 170 (Figure 12) is retractable from the film compartment. To accomplish this, the other end of shaft 369 has secured thereto a washer 171 against which the bifurcated end of a rigid arm 172 is adapted to bear when shaft 369 and accordingly disc 170 is moved in sprocket disengaging direction. The other end 172a of arm 172 is looped about and secured to the end of an operating shaft 173 (see also Figure 8). Shaft 173 is pivotally supported by angle 135, the other end of this shaft being similarly mounted in a bracket 174 secured to partition 45. Shaft 173 is curved or bent at 175 to clear a socket 176 which provides the lead-in terminals for motor 68 and other electrically actuated devices in compartment 47 (Figure 7). To the left-hand end of shaft 173, as viewed in Figure 8, is secured an operating arm or lever 177, the upper end 177a of which is secured to the shaft and lies within compartment 47, and the lower end 177b of which extends into film magazine compartment 46 (see Figure 12) close to and preferably parallel with side 48a of door 48. A projection 178 extends from end 177b of lever 177, and when the lever is in the position shown in Figure 12 projection 178 registers with and extends through an opening in side 48a of door 48 when the door is closed. To facilitate the locating of projection 178 with the hole in door side 48a, we preferably provide a spring generally indicated at 179 in Figure 12, the two arms 180 and 181 of which embrace opposite sides of projection 178 and accordingly act as a guide therefor, as well as a retaining device for holding lever 177 in proper position.

Still referring to Figure 12, we preferably provide a resilient arm or leaf spring 182, one end of which is secured to the end of shaft 173, and the other end of which presses against the end of shaft 369. Thus when shaft 173 is turned clockwise, as viewed in Figure 12, shaft 369 is resiliently biased in film feed sprocket engaging direction so that if the teeth 170a on disc 170 are not in proper position to enter sprocket 59 (Figure 10) they may ride over the sprocket until they register with the pockets therein, at which time spring arm 182 (Figure 12) snaps the disc teeth 170a into position.

From the above it will appear that when lever 177 is pivoted counterclockwise from the position shown in Figure 12, rigid arm 172, by reason of its engagement with washer 171, retracts disc 170 into a space 183 provided therefor. In other words, lever 177 and disc 170 are completely withdrawn from film magazine compartment 46 so as to permit insertion therein of the film magazine. Unless the lever and disc are thus completely retracted, the film magazine cannot be inserted, and accordingly jamming of the film feed drive mechanism is precluded. For the same reason, when the film magazine is in proper position within compartment 46, and lever 177 and disc 170 are in the position shown in Figure 12, it is impossible to withdraw the film magazine from its compartment, as the lever forms a positive stop against withdrawal of the film magazine, regardless of the position of door 48 (Figure 8). This, of course, also precludes jamming of the film feed drive mechanism.

It may now be seen that when the operator of the camera loads the camera, door 48 (Figure 8)

is swung open. If lever 177 is in the position shown, it is impossible to insert the film magazine. Hence the operator moves lever 177 and accordingly disc 170 (Figure 12) out of magazine compartment 46 so that the magazine may be inserted therein. Unless the magazine is properly positioned within its compartment 46, lever 177 cannot be swung into the position shown in Figure 12. When the magazine is properly positioned, however, the lever may then be swung to the position shown, with the result that disc 170 registers with film magazine sprocket 59 (Figure 10) and can engage therewith when the teeth of the sprocket register with the pockets in the sprocket. Also, when the several parts are in this position, door 48 (Figure 8) may be swung closed so that the opening therein registers with and receives lever projection 178.

As noted hereinabove, gear 132 (Figures 7 and 8) operates a portion of the film feed drive mechanism. Thus gear 132 (Figure 8) meshes with a gear 184 secured to a shaft 185, the upper end of which is journaled in one end of an angle 186 secured to partition 45. The other end of shaft 185 is journaled in the partition and extends therethrough. This latter end of shaft 185 has secured thereto a crank disc 187 or the like to which is pivotally connected an arm generally indicated at 188 (see Figures 10, 13 and 14). Referring back to Figure 8, shaft 185 also preferably has secured thereto a flywheel 189. Thus upon rotation of gear 132 through the gear train heretofore described, gear 184 and accordingly crank 187 are driven at that speed determined by the adjustment of the change gear system shown in Figure 9. It might also be noted that the gear train shown in Figure 7, and interconnecting gears 128 and 184, is so designed that the R. P. M. of these two gears is the same.

As is well known in motion picture camera construction, the film is fed intermittently, i. e., it is stationary during exposure. To obtain this intermittent feed of the film, arm 188 is provided. This arm, as noted above, is pivotally connected to crank 187 (Figure 13) so that rotation of the crank effects reciprocation of the arm. The end of arm 188 is provided with a hook 190 having a lug 191 formed thereon. Arm 188 has secured thereto and extending therefrom a stud 192 which rides in and is guided by a positive cam comprising a rigid stationary side 193 and a preferably resilient side 194. These cam sides, as shown in Figure 11, are secured to and extend at right angles from partition 45, and are so located with respect to the path of film 57 (Figure 13) that hook 190 and lug 191 are guided into successive film perforations 57a as arm 188 reciprocates, to advance the film as arm 188 moves from right to left, and to leave the film stationary as the arm moves downwardly. To assure engagement of film 57 by hook 190 at each driving stroke of arm 188, it is preferable that the path of travel of lug 191 be parallel to the path of travel of the film. To this end, cam side 193 is so contoured as to have a low spot at 193a, a gradually rising surface as at 193b, a high spot as at 193c, a downwardly inclined surface as at 193d, and a drop as at 193e. The shape of this cam surface is a function of the distance of the pivotal axis of arm 188 to the right and left of the axis of crank 187 as viewed in Figure 13, so that as the arm moves downwardly, lug 191 enters film perforation 57a almost immediately at the start of the arm's movement downward as viewed in Fig. 13, the lug entering the perforation along a path substantially at right angles to the plane of the film. As the arm moves from the position shown in Figure 13 substantially to the position of the arm shown in Figure 14, lug 191, which is in engagement with the film during this movement, travels a path parallel to the plane of the film. During this movement, arm stud 192 is traversing portions 193b, 193c, 193d and 193e of cam side 193. Immediately after arm 188 attains the position shown in Figure 14, stud 192 engages cam surface 193e, with the result that arm hook 190 and lug 191 pivot about the axis of stud 192 to assist in withdrawing the hook and lug out of film perforation 57a. Continued counterclockwise movement of crank 187 moves arm 188 to and through the position thereof shown in Figure 10, and during this travel of the arm, hook 190 and lug 191 are retracted from film 57 and accordingly the film remains stationary. As reciprocatory movement of arm 188 under these conditions is necessarily jerky, the resilience of cam side 194 accommodates such displacement of stud 192 from its true path as may occur. To assure travel of stud 192 along cam side 193, resilient cam side 194 is preferably contoured substantially similarly to cam side 193.

As noted above, the mechanism which drives crank 187 (Figure 10) and accordingly arm 188, is synchronized with the mechanism which drives film feed sprocket 59. To accommodate the intermittent action of arm 188 to the steady rotation of sprocket 59, film 57 is looped as indicated. It should also be noted that through the provision of the positive cam hereinbefore described, the intermittent drive mechanism may be greatly simplified as compared with known mechanisms of this general character, and may be installed in a limited space, thus greatly lending to the compactness of the camera as a whole.

The firing capacity of a 50 caliber machine gun is approximately 800 bullets per minute; that of a 30 caliber gun is approximately 1,300 per minute. The effective range of a 50 caliber gun is about 1,000 yards; that of a 30 caliber gun is about 600 yards. The muzzle velocity of both 50 and 30 caliber bullets is about 2,600 feet per second, or about 860 yards per second. Hence, if the target is one thousand yards from the gun there would be over 13 bullets in the air between the gun and the target at the same time, with respect to the 50 caliber gun. At 600 yards there would be about the same number of 30 caliber bullets in the air. Therefore, it would take about one second for all the bullets to take effect after the gun has stopped firing, and at least two seconds more to observe the effect of the 13 bullets.

Also if the camera stops taking pictures at the same time the gun stops firing, the camera cannot photograph the effect of the bullets fired two or three seconds before the gun stops firing. When it is considered that a four-second burst from four 50 caliber wing guns, or two 50 and two 30 caliber wing guns would result in a highly destructive burst of approximately 200 bullets, the desirability of photographing the effect of such a burst is immediately apparent. The same proposition, of course, holds true during simulated combat work, i. e., combat training, as otherwise the scoring would be inaccurate. Accordingly, as noted above, it is important that the machine gun camera be capable not only of photographing the effect of bullets fired a few seconds before the gun stops firing, but also the effect of bullets in the air between the target and the gun after the gun stops firing. To this end there is provided what will hereinafter be termed an overrun device which maintains the camera in operation for a predetermined period of time after the gun stops firing.

Figure 15:
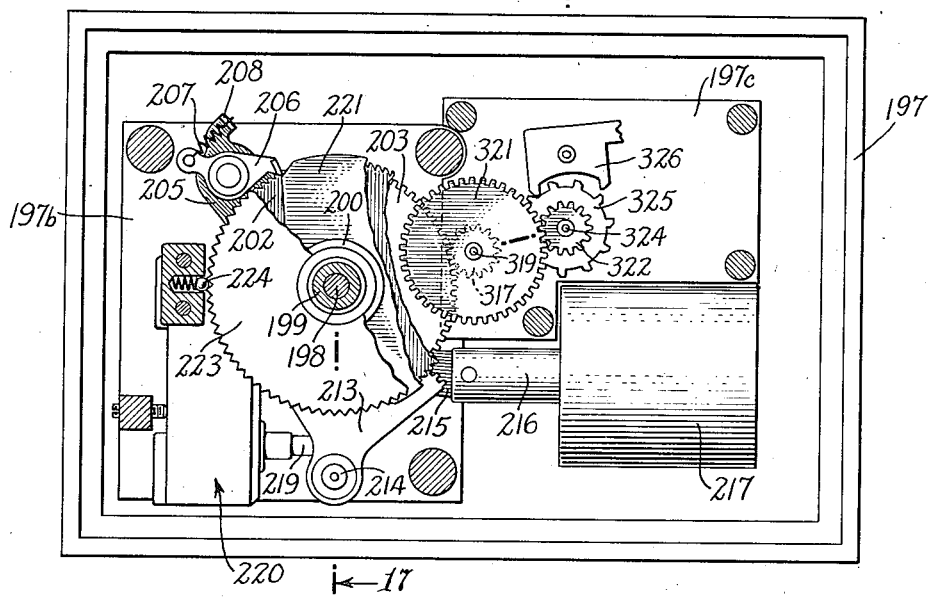
Figure 15 is a top plan view of the overrun device with its cover removed and certain parts broken away.
Figure 16:
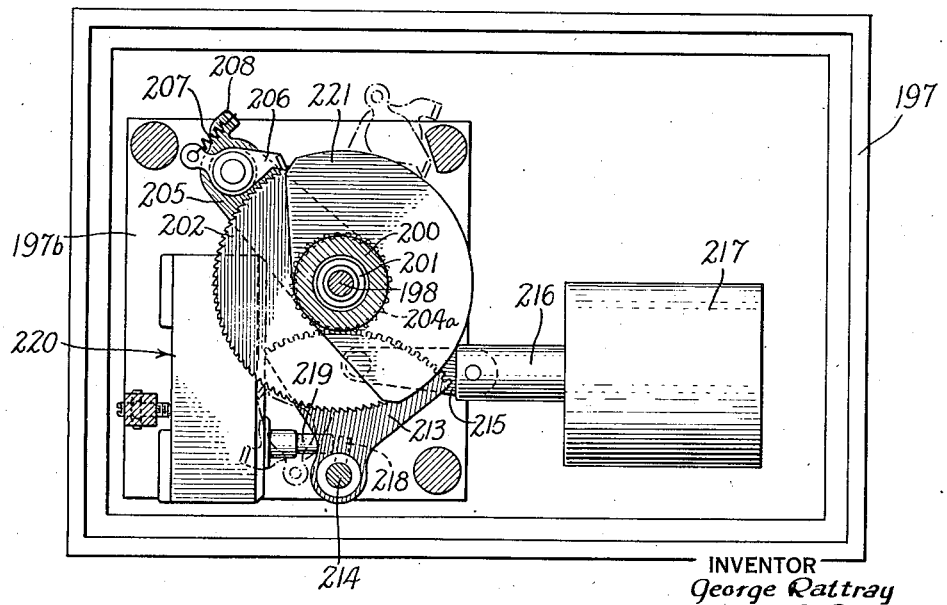
Figure 16 is a view similar to Figure 15 but taken at a different plane as along the line 16—16 of Figure 17.

As shown in Figure 2, the overrun device, generally indicated at 195, is located in the cockpit convenient to the pilot, and is electrically connected to camera 22 by a cable 196. As shown in Figure 15, overrun device 195 is housed in a casing 197, within which is mounted a rotatable central shaft 198 (Figure 17). This shaft extends through one side 197a of casing 197 and supports the elongated sleeve 199 of a hub 200 located within the casing adjacent side 197a; shaft 198 also rotatably supports a collar 201 which has secured thereto a ratchet 202 and a spur gear 203, the diameter of which is slightly less than that of the ratchet. Still another collar 204 is rotatably mounted on shaft 198 and to this collar is secured a pawl arm 205, to the end of which (as seen in Figure 16) is pivoted a pawl 206 (see also Figure 18). Pawl 206 is biased toward ratchet engaging position by a spring 207, one end of which is connected to the pawl and the other end of which is connected to a lug 208 on pawl arm 205.

A supporting wall 197b in casing 197 (Figure 17) rotatably carries a bushing 209 or the like which is held in constant spaced relation to collar 204 by a sleeve spacer 210 mounted on shaft 198. A spring 211 is coiled about spacer sleeve 210 and its opposite ends are connected respectively to collar 204 and bushing 209. Movement of adjustor bushing 209 relative to collar 204 tensions the spring as desired. A suitable detent 212 is mounted on wall 197b for holding spring adjustor 209 in its adjusted position.

From the above it will appear that ratchet 202 and gear 203 move together as both are secured to collar 201 and that by reason of the engagement between pawl 206 and ratchet 202 the ratchet and accordingly gear 203 are driven in one direction by spring 211.

Collar 204 includes a gear 204a which meshes with a gear segment 213 (Figure 18) pivotally mounted on a shaft 214 (Figure 16) supported between walls 197a and 197b. As is more clearly shown in Figure 18, gear segment 213 has pivotally connected thereto one end of a link 215, the other end of which is pivotally connected to the plunger 216 of a solenoid 217. Solenoid 217 is adapted to be energized upon initial actuation of the machine gun and the camera, and when so energized causes spring 211 to be loaded by reason of the coaction of gear segment 213 and gear 204a.

Gear 203 (Figure 17) meshes with a spur gear 317 which has an integral hub 318 pinned to a stud 319 journaled in casing wall 197a and a partition 197c supported within casing 197. This hub has mounted thereon a gear 321 which meshes with a gear 322 which, with its hub 323, is secured to stud 324 journaled in casing wall 197a and partition 197c. Hub 323 carries a star wheel 325 adapted to cooperate with a pallet 326 (see Figure 18) which with the star wheel form an escapement to regulate the rate of rotation of gear 203 as driven by spring 211. It will now appear that gear 203 rotates at a relatively slow constant rate under the driving bias of spring 211 by reason of the governing action of the gear train connecting gear 203 with the escapement formed by star wheel 325 and pallet 326.

Gear 203 is, of course, driven by spring 211, by reason of the ratcheting engagement of ratchet 202 and pawl 206, ratchet arm 205 and accordingly collar 204, together with gear segment 213 likewise being driven. Shaft 214, which carries gear segment 213, has extending at right angles therefrom a pin 218, which is engageable with a plunger 219, which actuates a double pole single throw micro-switch, generally indicated at 220.

As will appear hereinafter, micro-switch 220 is normally in the "off" position, i. e., the motor circuit is open but a heater circuit (described below) is closed. Also, as will appear, when the pilot closes the stick switch which actuates the machine gun or guns, solenoid 217 is energized to load spring 211 as heretofore described. When the pilot releases the main switch, solenoid 217 is deenergized, with the result that spring 211 drives shaft 214 and accordingly pin 218 counterclockwise, as viewed in Figure 18, through the extent of its travel. Just before pin 218 reaches the end of its travel, it engages micro-switch plunger 219 which during the operation of the overrun device has been in the "on" position, and opens switch 220, breaking the circuit to the camera motor. Hence the camera is operated for a period of time which is predeterminable, as will appear, subsequent to cessation of gun fire.

Preferably the various parts of the overrun device are designed for a maximum operating period of the device, for example, three seconds. Under certain circumstances, however, it may be desirable that the overrun device operate for a shorter period of time. To this end a cam 221 (Figure 16) is secured to sleeve hub 200, the radius of cam 221 being slightly in excess of that of ratchet 202 so as to cover a portion of the ratchet. The position of cam 221 in relation to ratchet 202 may be adjusted through manipulation of a control knob 222 mounted on and connected to the outer end of sleeve 199 (Figures 17 and 18). In order to maintain the cam in its adjusted position, a gear 223 (Figure 15) is also carried by sleeve hub 200, and the teeth of this gear engage a spring biased ball 224 which holds the gear, and accordingly the cam, in adjusted position.

When cam 221 is set in the position desired, it is located to trip pawl 206 (Figure 15) at the end of the predetermined period of operation of the overrun device. When the pawl is so tripped, pawl arm 205 operates freely and rapidly to return to its "off" or dotted line position, wherein the camera motor is deenergized through the operation of micro-switch 220, as described. Preferably the teeth in gear 223 are so cut that their position is such that the distance between centers of adjacent teeth subtends one-twentieth of a second. In other words, the overrun device is adjustable in increments of one-twentieth of a second. To assist determination of the period of operation of the overrun device, control knob 222 preferably includes a pointer 222a (Figure 18) suitably calibrated in time units to facilitate predetermination of the period of operation of the overrun.

To facilitate scoring the photographic results, it is desirable that a record of the period of operation of the overrun device appear on the film. To this end, with reference to Figure 8, an electro-magnet 225 is mounted on a bracket 226 secured within compartment 47. To the flapper 225a of magnet 225 is secured an elongated pin 227 (Figure 11) the end of which projects into the space between the forward end of magazine 50 (Figure 10) and partition 53 so as to be visible through opening 52 in the partition. It might be noted that preferably the sides of opening 52 include pairs of projections 228 and 229 which take the place of cross hairs. Thus, when the overrun device is operating to run the camera, after the machine gun has stopped firing, magnet 225 is deenergized, as will appear later, to cause pin 227 to assume the position shown in Figure 11. In other words, a picture of pin 227 will appear on the film during the operation of the overrun device.

Instead of the overrun indicator comprising magnet 225 and pin 227, shown in Figure 11, a small electric light (not shown) may be installed in the corner of opening 52, taking the place of the end of pin 227. When such a light is used, it will burn at all times upon operation of the camera, except when the overrun device is operating. Hence, during normal operation of the camera, a corner of the film will be fogged by the light, making the period of overrun control readily determinable.

With reference to the wiring diagram shown in Figure 19, the main airplane battery is indicated at 230 and has its negative side connected by a lead 231 to a terminal 232 in overrun device 195. Terminal 232 is connected to a terminal 233 in the overrun by a line 234, while terminal 233 is connected to a terminal 235 in camera 22 by a wire 236 which is one of the wires in cable 196. A lead 237 connected to camera terminal 235 is also connected to one side of motor 68, to one side of a heater 238, and to one side of solenoid 225 of the overrun indicator. In connection with heater 238, this heater, as is shown in Figure 7, is mounted next to motor 68, and as will later appear, is energized while the motor is deenergized through the operation of micro-switch 220.

From the above, it may be seen that leads 231, 234, 236 and 237 comprise a common ground for the entire control circuit.

The positive side of battery 230 is connected to a terminal 239 in overrun device 195, and this terminal is connected by a lead 240 to the movable central contact 241 of micro-switch 220, the two stationary contacts of which are designated 242 and 243. Switch contact 243 is connected by a lead 244 to a terminal 245 which is in turn connected to a terminal 246 by a wire 247 which is another wire in connector cable 196. Terminal 246 in the camera is connected by a lead 248 to the other side of motor 68 so that when contacts 241 and 243 of switch 220 are closed the motor circuit is completed.

Switch terminal 242 is connected by a lead 249 to a terminal 250 in the overrun device which is connected to a terminal 251 in the camera by another wire 252 of connector cable 196. Camera terminal 251 is connected by a lead 253 through a thermostat 254 to the other side of heater 238. Thus it will appear that when contacts 241 and 242 of switch 220 are closed, the circuit to motor 68 is broken, but that to heater 238 is closed, depending upon the condition of thermostat 254. Of course, if the temperature within camera 22 is above a predetermined maximum, thermostat switch 254 is open to prevent energization of heater 238.

The positive side of battery 230 is connected by a lead 255 to a gun operating solenoid 300 which when energized operates gun 301, this solenoid in turn being connected by a lead 302 to one contact 303 of the main stick switch 256 located on the airplane controls for easy operation by the pilot. The other contact 304 of stick switch 256 is connected by a lead 257 to a terminal 258 of overrun device 195, and this terminal is in turn connected by lead 259 to the common terminal 260 of a double pole single throw switch generally indicated at 261. This switch is preferably located on the face of the overrun device 195 so as to be readily accessible to the pilot. Double pole switch 261 includes an "on" terminal 262, and an "off" terminal 263, the former of which is connected by a lead 264 to a terminal 265, and the latter of which is connected to overrun terminal 245 by way of lead 244 and a lead 266. Overrun terminal 265 is connected to terminal 267 in camera 22 by still another wire 268 in connector cable 196, camera terminal 267 in turn being connected by a lead 269 to the other side of overrun indicator solenoid 225.

Overrun solenoid 217 is connected to lead 264 and by way of a lead 270 to lead 234, accordingly being connected across battery 230 when switch 261 is in its "on" position. When switch 261 is in its "off" position, the overrun is bypassed by way of line 266. In the normal condition of micro-switch 220, contacts 241 and 242 thereof are in engagement under which condition heater 238 is energized, current flowing through the heater as long as thermostatic switch 254 is closed. Upon energization of overrun solenoid 217, however, micro-switch contacts 241 and 243 engage to energize motor 68, it being noted that when the motor is energized the circuit to heater 238 is broken as contacts 241 and 242 of the micro-switch separate.

In operation, assuming that the pilot desires to use overrun device 195 and accordingly closes switch 261, closing of stick switch 256 completes a circuit through overrun solenoid 217, operation of which causes micro-switch plunger 219 to close contacts 241 and 243 of the micro-switch. The engagement of these contacts completes the circuit to and accordingly energizes motor 68, and at the same time breaks the circuit to and accordingly deenergizes heater 238. Accordingly, as long as stick switch 256 remains closed, solenoid 217 is energized, as is also motor 68. When stick switch 256 is opened, however, overrun solenoid 217 is deenergized, thus permitting the overrun device to operate for a predetermined period of time, as hereinbefore described. During the operation of the overrun device, micro-switch contacts 241 and 243 are kept closed to continue energization of the camera motor 68 so that the camera continues to operate although the gun has ceased firing. Operation of the camera is continued until the end of the overrun operation when movement of micro-switch plunger 219 effects separation of micro-switch contacts 241 and 243. Such separation, of course, deenergizes the camera motor and stops the camera. It should also be noted that when overrun solenoid 217 is energized, the overrun indicator magnet 225 is also energized. Both of these however, are deenergized simultaneously upon the opening of stick switch 256, at which time the overrun device commences its operation. Deenergization of overrun indicator magnet 225 causes the end of pin 227 (Figure 11) to enter aperture 52, or extinguishes the light (not shown) referred to above, so that the beginning of overrun operation can be readily determined.

Accordingly, it will now appear that the machine gun camera attains the various objects set forth hereinabove in a thoroughly practical and efficient manner.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

We claim:

1. In apparatus of the character described, in combination, a machine gun, a motion picture camera associated with said gun and arranged to photograph the field of fire of the gun so as to record actual or simulated gun fire, a solenoid for operating said gun, an electric motor for operating said camera, a circuit for said gun solenoid including a source of current and a main switch closable to energize said circuit and operate said solenoid, a second circuit for said camera motor and having a switch which when closed energizes said second circuit to operate said motor, a second solenoid connected in said first circuit, means connecting said second solenoid and said second switch for closing said second switch when said second solenoid is energized, a spring motor connected to said second solenoid and adapted upon energization thereof to be wound thereby, said spring motor being held in wound condition as long as said second solenoid is energized, mechanical escapement means for retarding the rate of operation of said spring motor upon deenergization of said second solenoid, and means operated by said spring motor after a predetermined amount of time for opening said second switch thereby to maintain said camera in operation subsequent to opening of said main switch.

2. In apparatus of the character described, in combination, a machine gun, a motion picture camera associated with said gun and arranged to photograph the field of fire of the gun so as to record actual or simulated gun fire, a solenoid for operating said gun, an electric motor for operating said camera, a circuit for said gun solenoid including a source of current and a main switch closable to energize said circuit and operate said solenoid, a second circuit for said camera motor having a normally open switch which when closed energizes said second circuit to operate said motor, means responsive to energization of said gun solenoid circuit and operatively associated with said normally open switch for closing said normally open switch when said first circuit is energized, a spring connected to said responsive means and adapted to be tensioned and held in tension thereby upon energization of said responsive means and released upon deenergization thereof, a clockwork device connected to and adapted to be driven by said spring upon release thereof, means operated by said device for opening said second switch to stop the operation of said camera, and means for controlling the period of operation of said device to delay for a predetermined time the operation of said switch opening means.

3. Apparatus according to claim 2 wherein means are provided for effecting energization of said camera motor exclusively of said responsive means, and means associated with said camera for making a mark on the film to indicate the inoperativeness of said responsive means and accordingly of said clockwork device.

4. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, means energized simultaneously with energization of said gun circuit for effecting energization of said camera circuit, whereby the gun and camera are operated simultaneously, means rendered operative upon deenergization of said gun circuit for effecting deenergization of said camera circuit subsequent to deenergization of said gun circuit thereby to keep said camera operating subsequent to deenergization of said gun circuit and said gun firing means, means conditioning for operation said deenergizing means upon energization of said gun circuit, an electric heater in said camera, a circuit for said heater, and means responsive to the denergization of said camera circuit for energizing said heater circuit whereby said heater is operable when the camera operating means is deenergized.

5. In apparatus of the character described, in combination, a machine gun, a motion picture camera associated with said gun and arranged to photograph the field of fire of the gun so as to record actual or simulated gun fire, energizable means for operating said gun, an electric motor for operating said camera, gun circuit means including a source of current, said gun operating means and a main switch closable to energize said circuit and operate said gun operating means, a camera circuit for said camera motor having a normally open switch which when closed energizes said camera circuit to operate said motor, a solenoid in said gun circuit responsive to energization thereof and operatively connected with said normally open switch for closing said normally open switch when said gun circuit is energized, a spring connected to said solenoid and adapted to be tensioned and held in tension thereby upon energization of said gun circuit and released upon deenergization thereof, a clockwork device connected to said spring and driven thereby upon release thereof by the deenergization of said solenoid, means for controlling the rate of operation of said device, and means operated by said device after a predetermined time for opening said normally open switch, whereby the operation of the camera may be continued after said main switch is opened.

6. In apparatus of the character described, in combination, a machine gun, a motion picture camera associated with said gun and arranged to photograph the field of fire of the gun so as to record actual or simulated gun fire, energizable means for operating said gun, an electric motor for operating said camera, gun circuit means including a source of current, said gun operating means and a main switch closable to energize said circuit and operate said gun operating means, a camera circuit for said camera motor having a normally open switch which when closed energizes said camera circuit to operate said motor, a solenoid in said gun circuit and responsive to energization thereof and operatively connected with said normally open switch for closing said normally open switch when said gun circuit is energized, a spring connected to said solenoid and adapted to be tensioned and held in tension thereby upon energization of said gun circuit and released upon deenergization thereof, said spring being adapted to open said normally open switch when said gun circuit and accordingly said solenoid is deenergized, a clockwork device connected to said spring and driven thereby upon release thereof when said solenoid is deenergized, means operated by said device after a predetermined period of time for opening said normally open switch, thereby to maintain said camera motor in operation after the main switch is opened, and control means for setting the period of operation of said device to selectively determine the extent of the delay in the opening of said normally open switch.

CLINTON B. GATY.
GEORGE RATTRAY.